(12) United States Patent
Coster et al.

(10) Patent No.: US 7,304,009 B2
(45) Date of Patent: *Dec. 4, 2007

(54) COLOURED SODA-LIME GLASS

(75) Inventors: Dominique Coster, Jumet (BE); Marc Foguenne, Jumet (BE); Laurent Delmotte, Jumet (BE)

(73) Assignee: Glaverbel, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 10/311,682

(22) PCT Filed: Jun. 14, 2001

(86) PCT No.: PCT/EP01/06861

§ 371 (c)(1),
(2), (4) Date: Dec. 19, 2002

(87) PCT Pub. No.: WO01/98221

PCT Pub. Date: Dec. 27, 2001

(65) Prior Publication Data
US 2004/0157723 A1 Aug. 12, 2004

(30) Foreign Application Priority Data
Jun. 19, 2000 (EP) .................. 00202125

(51) Int. Cl.
*C03C 3/087* (2006.01)
(52) U.S. Cl. ....................................... 501/71
(58) Field of Classification Search ............... 501/70, 501/71
See application file for complete search history.

(56) References Cited

U.S. PATENT DOCUMENTS

| | | | |
|---|---|---|---|
| 4,104,076 A * | 8/1978 | Pons ............... | 501/66 |
| 5,545,596 A | 8/1996 | Alvarez Casariego et al. | |
| 5,688,727 A | 11/1997 | Shelestak et al. | |
| 5,728,471 A * | 3/1998 | Dupont et al. ............... | 428/432 |
| 5,985,780 A * | 11/1999 | Alvarez Casariego et al. ... | 501/71 |
| 5,998,316 A * | 12/1999 | Seto et al. ............... | 501/71 |
| 6,071,840 A * | 6/2000 | Sasage et al. ............... | 501/71 |
| 6,335,299 B1 | 1/2002 | Foguenne et al. | |
| 6,589,897 B1* | 7/2003 | Foguenne ............... | 501/71 |
| 2005/0148453 A1* | 7/2005 | Coster et al. ............... | 501/64 |
| 2005/0164863 A1* | 7/2005 | Coster et al. ............... | 501/70 |

FOREIGN PATENT DOCUMENTS

| | | |
|---|---|---|
| EP | 0798271 A1 | 10/1997 |
| EP | 0803479 A | 10/1997 |
| EP | 0816296 A1 | 1/1998 |
| EP | 0849233 A1 | 6/1998 |
| GB | 2289273 A | 11/1995 |
| GB | 2315487 A | 2/1998 |
| JP | 10095632 | 4/1998 |
| JP | 11217234 | 8/1999 |
| JP | 2001019470 A * | 1/2001 |
| WO | WO00/01633 A * | 1/2000 |
| WO | WO0117920 | 3/2001 |

* cited by examiner

Primary Examiner—David M Brunsman
(74) Attorney, Agent, or Firm—Akerman Senterfitt

(57) ABSTRACT

The invention concerns a soda-lime glass. Said colored glass contains at least 5 parts per million of Co by weight and 0.5 to 0.9 wt. % $Fe_2O_3$ oxide. The amount of ferrous iron by weight of $Fe^{2+}$ atoms relative to the total weight of iron atoms present in the glass ranges between 25 and 45%. Said glass further comprises chromium and/or vanadium. The glass has a light transmission factor TLA4 ranging between 10 and 50% and an energy transmission wavelength less than 491 nm. Said glass is particularly suited for producing blue-tinted glazing for motor vehicles.

14 Claims, No Drawings

COLOURED SODA-LIME GLASS

CROSS REFERENCE TO RELATED APPLICATIONS

This application is the U.S. National Stage of International Application No. PCT/EP01/06861 filed 14 Jun., 2001, and claims the priority of European Application No. 00202125.1 filed 19 Jun., 2000. The entirety of each of those applications is incorporated herein by reference.

BACKGROUND OF THE INVENTION

The present invention relates to a coloured soda-lime glass.

Soda lime glass may be clear or coloured, for example green, grey or blue in transmission The expression "soda-lime glass" is used here in the wide sense and relates to any glass which contains the following constituents (in percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is very widely used in the field of glazing, for example for motor vehicles or buildings. It is usually manufactured in the form of a ribbon by the float process. Such a ribbon can be cut into sheets which can then be bent or can undergo a treatment to improve their mechanical properties, for example a thermal toughening step.

It is generally necessary to relate the optical properties to a standard illuminant. In the present description, 2 standard illuminants are used, namely illuminant C and illuminant A defined by the Commission Internationale de l'Eclairage (C.I.E.). Illuminant C represents average daylight having a colour temperature of 6700 K. This illuminant is especially useful for evaluating the optical properties of glazing intended for buildings. Illuminant A represents the radiation of a Planck radiator with a temperature of about 2856 K. This illuminant describes the light emitted by car headlights and is above all intended to evaluate the optical properties of windows intended for motor vehicles.

The Commission Internationale de l'Eclairage has also published a document entitled "Colorimétrie, Recommandations Officielles de la C.I.E." [*Colorimetry and Official Recommendations of the C.I.E.*] (May 1970) which describes a theory in which the colorimetric co-ordinates for light of each wavelength of the visible spectrum are defined so as to be able to be represented on a diagram having orthogonal axes x and y, called the C.I.E. 1931 chromaticity plot. This chromaticity plot shows the locus representative of light of each wavelength (expressed in nanometers) of the visible spectrum. This locus is called the "spectrum locus" and light whose co-ordinates lie on this spectrum locus is said to have 100% excitation purity for the appropriate wavelength. The spectrum locus is closed by a line called the purple boundary which connects the points of the spectrum locus whose co-ordinates correspond to wavelengths of 380 nm (violet) and 780 nm (red). The area lying between the spectrum locus and the purple boundary is that available for the chromaticity co-ordinates of any visible light. The co-ordinates of the light emitted by illuminant C, for example, correspond to x=0.3101 and y=0.3162. This point C is regarded as representing white light and consequently has an excitation purity equal to zero for any wavelength. Lines may be drawn from the point C to the spectrum locus at any desired wavelength and any point lying on these lines may be defined not only by its x and y co-ordinates but also as a function of the wavelength corresponding to the line on which it lies and on its distance from the point C relative to the total length of the wavelength line. Consequently, the colour of the light transmitted by a coloured glass sheet may be described by its dominant wavelength $\lambda_D$ and its excitation purity (P) expressed as a percentage.

The C.I.E. co-ordinates of light transmitted by a coloured glass sheet will depend not only on the composition of the glass but also on its thickness. In the present description, and in the claims, all the values of the excitation purity P and of the dominant wavelength $\lambda_D$ of the transmitted light are calculated from the spectral specific internal transmissions ($SIT_\lambda$) of a glass sheet 5 mm in thickness with illuminant C under a solid viewing angle of 2°. The spectral specific internal transmission of a glass sheet is governed solely by the absorption of the glass and can be expressed by the Beer-Lambert law:

$SIT_\lambda = e^{-E \cdot A_\lambda}$ where $A_\lambda$ is the absorption coefficient (in $cm^{-1}$) of the glass at the wavelength in question and E is the thickness (in cm) of the glass. To a first approximation, $SIT_\lambda$ may also be represented by the formula:

$$(I_3+R_2)/(I_1-R_1)$$

where $I_1$ is the intensity of the visible light incident on a first face of the glass sheet, $R_1$ is the intensity of the visible light reflected by this face, $I_3$ is the intensity of the visible light transmitted from the second face of the glass sheet and $R_2$ is the intensity of the visible light reflected by this second face towards the interior of the sheet.

The colour rendition index, expressed by a number between 1 and 100, represents the difference between a colour and the perception that an observer has of it when he looks at it through a coloured transparent screen. The greater this difference, the lower the rendition index of the colour in question. For a constant wavelength $\lambda_D$, the rendition index of a colour perceived through this glass decreases when the colour purity of the glass increases. The colour rendition index is calculated according to the EN 410 standard, which defines a mean colour rendition index ($I_c$). The index $I_c$ used hereafter is calculated for a glass 4 mm in thickness.

In the description which follows and in the claims, the following are also used:

for illuminant A, the total light transmission (TLA) measured for a thickness of 4 mm (TLA4) under a solid viewing angle of 2°. This total transmission is the result of the integration between the 380 and 780 nm wavelengths of the expression: $\Sigma T_\lambda \cdot E_\lambda \cdot S_\lambda / \Sigma E_\lambda \cdot S_\lambda$ in which $T_\lambda$ is the transmission at the wavelength $\lambda$, $E_\lambda$ is the spectral distribution of illuminant A and $S_\lambda$ is the sensitivity of the normal human eye as a function of the wavelength $\lambda$;

the total energy transmission (TE) measured for a thickness of 4 mm (TE4). This total transmission is the result of the integration between the 300 and 2500 nm wavelengths of the expression: $\Sigma T_\lambda \cdot E_\lambda / \Sigma E_\lambda$. The energy distribution $E_\lambda$ is the spectral energy distribution of the sun at 30° above the horizon, with a mass of air equal to 2 and an inclination of the glazing with respect to the horizontal of 60°. This distribution, called the "Moon distribution", is defined in the ISO 9050 standard;

the selectivity (SE) measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma T_\lambda \cdot U_\lambda / \Sigma U_\lambda$, in which $U_\lambda$ is the spectral distribution of the ultraviolet radiation that has passed through the atmosphere, defined in the DIN 67507 standard.

the $Fe^{2+}$/total Fe ratio, sometimes called the redox ratio, which represents the value of the ratio of the weight of $Fe^{2+}$ atoms to the total weight of iron atoms in the glass and which is obtained by the formula:

$Fe^{2+}$/total Fe=$[24.4495 \times \log(92/\tau_{1050})]/t\text{-}_{Fe2O3}$ where $\tau_{1050}$ represents the specific internal transmission of the 5 mm-thick glass at the 1050 nm wavelength and $t\text{-}_{Fe2O3}$ represents the total iron content expressed in $Fe_2O_3$ oxide form and measured by X-ray fluorescence.

Coloured glass can be used in architectural applications and as glazing for railway carriages and motor vehicles. In architectural applications, glass sheets 4 to 6 mm in thickness are generally used while in the motor-vehicle field thicknesses of 1 to 5 mm are normally employed, particularly for the production of monolithic glazing, and thicknesses of between 1 and 3 mm in the case of laminated glazing, especially for windscreens, two glass sheets of this thickness then being bonded together by means of an interlayer film, generally made of polyvinyl butyral (PVB).

One of the objects of the invention is to produce a soda-lime glass comprising iron, cobalt and chromium and/or vanadium, which combines optical and energy properties, in particular an aesthetically attractive coloration and a low energy transmission, which are particularly, but not exclusively, suitable for the field of glazing for motor vehicles.

The invention provides a coloured soda-lime glass whose composition comprises:
iron in an amount which, expressed by weight to $Fe_2O_3$ oxide with respect to the total weight of glass, is between 0.5 and 0.9% (total amount of iron);
ferrous iron in an amount which, expressed by weight of $Fe^{2+}$ atoms with respect to the total weight of iron atoms present in the glass, is between 25 and 45% ($Fe^{2+}$/total Fe ratio);
cobalt in an amount which, expressed by weight of Co with respect to the total weight of glass, is at least 5 parts per million;
chromium and/or vanadium
and the glass has:
a light transmission, measured under illuminant A and calculated for a thickness of 4 mm, of between 20 and 60% (TLA4),
an energy transmission, measured according to the Moon distribution and calculated for a thickness of 4 mm, of between 10 and 50% (TE4)
a dominant wavelength $\lambda_D$ in transmission of less than 491 nm.

It has been found that such a glass makes it possible to meet both the aesthetic and energy conditions which are commercially desirable. In particular in the field of motor vehicles, a coloured glass according to the invention may have a blue tint, having a dominant wavelength in transmission of less than 491 nm, which is appreciated by motor-vehicle manufacturers, and a low energy transmission making it possible to limit the heat-up of the vehicle's interior.

The presence of at least one of the chromium and vanadium components and the compositional criteria relating to iron and cobalt make it possible to produce a glass whose dominant wavelength in transmission, whose light transmission and whose energy transmission meet the current aesthetic and energy criteria, in particular of motor-vehicle manufacturers.

Iron is present in most glass on the market, in particular in coloured glass. The presence of $Fe^{3+}$ gives the glass a slight absorption of visible light of short wavelength (410 and 440 nm) and a very strong absorption band in the ultraviolet (the absorption band centred on 380 nm), whereas the presence of $Fe^{2+}$ ions causes a strong absorption in the infrared (the absorption band centred on 1050 nm). The presence of $Fe^{3+}$ gives the glass a slight yellow coloration, generally regarded as being somewhat unattractive, whereas the ferrous ions $Fe^{2+}$ give a pronounced blue-green coloration. A high $Fe^{2+}$ concentration in the glass therefore makes it possible to reduce the energy transmission TE and to give an attractive coloration. However, the presence of iron in the pool of molten glass causes the infrared radiation to be absorbed, which may be an obstacle to the diffusion of heat in the glassmaking furnace and therefore may make this manufacture more difficult. In addition, when the iron concentration increases, the light transmission of the glass decreases.

Moreover, the presence of cobalt has a tendency to give the glass an intense blue coloration.

The presence of $Cr^{III}$ has a tendency to give the glass a light green coloration, whereas the presence of $Cr^{VI}$ gives the glass a very strong absorption band at 365 nm and a yellow coloration.

The presence of vanadium tends to give the glass a green tint.

The energy and optical properties of a glass, in particular its colour, its light transmission and its energy transmission, result from a complex interaction between its components. The behaviour of the components of the glass depends on their redox state and therefore on the presence of other components which may have an influence on the redox state.

It has been found that the glass as defined in the claims makes it possible to meet the aesthetic criteria (colour) and optical/energy criteria (light transmission and energy transmission) by an easy control of its composition in terms of iron, cobalt and chromium and/or vanadium.

Preferably, the amount of total iron is less than or equal to 0.89%, preferably less than or equal to 0.88%. This makes it easier to switch from the manufacture of clear glass to the manufacture of coloured glass.

Preferably, the amount of total iron is at least 0.7% or even at least 0.75%. This is conducive to obtaining a low TE and a colour pleasing to the eye.

To produce a glass whose colour is commercially desirable, being judged pleasing to the eye, it has been found that it is preferable that the glass meets one or more of the following criteria:
preferably, the amount of cobalt is less than or equal to 300 parts per million. An excessively high amount of cobalt may impair the selectivity;
advantageously, the amount of cobalt is between 20 and 200 parts per million, preferably between 60 and 120 parts per million, for example between 60 and 110 parts per million;
preferably, the amount of chromium, expressed by weight of $Cr_2O_3$ with respect to the total weight of glass, is greater than 5 parts per million, 10 parts per million and even 20 parts per million. Advantageously, the amount of chromium is greater than 50 parts per million;

advantageously, the amount of chromium is less than or equal to 300 parts per million, preferably less than or equal to 250 parts per million, in particular less than 220 parts per million;

preferably the glass contains vanadium in an amount which, expressed by weight of $V_2O_5$ with respect to the total weight of glass, is greater than 20 parts per million. For example, it is between 50 and 500 parts per million.

In particular embodiments of the invention, in which the coloured glass contains vanadium, the latter is preferably present in an amount of at least 20 parts per million of vanadium expressed by weight of $V_2O_5$ with respect to the total weight of glass. In the presence of such an amount of vanadium, the presence of chromium in the glass is not absolutely essential in order to obtain the desired optical and energy property characteristics.

However, the coloured glass according to the invention preferably contains an amount of vanadium of less than 20 parts per million. In this case, the presence of chromium in the glass is essential for realizing the invention.

As a variant, the coloured glass according to the invention contains both chromium and vanadium, for example 3 parts per million of chromium and 5 parts per million of vanadium.

The light transmission TLA4 may be between 20 and 60%, advantageously between 25 and 55% and preferably between 38 and 52%. This makes the coloured glass according to the invention very suitable for being used, for example, as motor-vehicle glazing, especially as side windows or as rear windows. For example, the TLA4 may be between 40 and 48%.

It is desirable for the coloured glass to have an energy transmission TE4 of between 10 and 50%, advantageously of between 15 and 40% and preferably between 22 and 34%. A low energy transmission makes it possible, when the sun is shining, to limit the heat-up of the internal volume bounded by the glass, such as a building or a motor vehicle.

For a darker version of the coloured glass, the TLA4 is between 20 and 40% and preferably between 25 and 35%. In this case, the TE4 varies between 10 and 30%, preferably between 15 and 25%.

Preferably, the glass has a selectivity greater than 1.2, preferably greater than 1.35. A high selectivity is advantageous both for motor-vehicle applications and for architectural applications since it makes it possible to limit heat-up due to solar radiation and therefore to increase the thermal comfort of the occupants of the vehicle or building, while still providing a high level of natural illumination and visibility through the glazing.

With regard to the colour of the glass according to the invention, it is desirable that its dominant wavelength $\lambda_D$ in transmission be less than or equal to 490 nm. This corresponds to a glass whose colour in transmission is generally termed to be blue, which appears attractive to the human eye and which is commercially highly desirable, especially for motor-vehicle glazing. It is advantageous that the glass have a $\lambda_D$ of between 482 and 488 nm.

Preferably, the excitation purity in transmission of the glass according to the invention is greater than 5%, preferably greater than 10% or even 12%. This corresponds to a commercially desirable pronounced tint. It is especially preferred that the purity be between 15 and 25%.

Preferably, the glass according to the invention has a mean colour rendition index ($I_c$) which satisfies the following relationship:

$$I_c > -0.59P + 81,$$

where P is the absolute value (not a percentage) of the purity. Preferably, the mean colour rendition index satisfies the relationship:

$$I_c > -0.59P + 84.$$

For a given purity of the glass, such an index results in a very low distortion of the colours as perceived by an observer through a sheet of the said glass.

A high value of the mean colour rendition index means that an observer will have a natural perception of his environment through a coloured glass sheet according to the invention.

This advantage is particularly appreciated from the commercial standpoint. This is because vision through certain other types of commercially available coloured glass is marked by a colour distortion deemed to be unattractive by users, particularly when the environment and people seen through this glass appear yellowish.

The coloured glass according to the invention preferably has a total ultraviolet transmission TUV4 of less than 30%. This makes it possible to limit the unattractive discoloration of objects placed inside volumes bounded by the glazing according to the invention, due to the effect of ultraviolet solar radiation.

Preferably, the glass contains less than 2%, preferably less than 1%, or even less than 0.1%, titanium expressed by weight of $TiO_2$ with respect to the total weight of glass. A high amount of $TiO_2$ runs the risk of giving a yellow coloration, which is undesirable. In certain cases, the glass will contain $TiO_2$ only as a result of the presence of impurities, without any intentional addition.

It is desirable that the glass according to the invention contain less than 2%, preferably less than 1%, cerium expressed by weight of $CeO_2$ with respect to the total weight of glass. The glass according to the invention may contain less than 0.1% cerium. Cerium has a tendency to shift the dominant wavelength towards the green and yellow, and therefore away from the preferred tint. Furthermore, cerium is a very expensive component.

Advantageously, the glass according to the invention contains less than 200 parts per million, preferably less than 100 parts per million, of nickel expressed by weight of NiO with respect to the total weight of glass. The presence of nickel may impair the selectivity of the glass containing it, as it does not absorb the light in the infrared range. This results in a high energy transmission value. In addition, it gives the glass a yellow coloration. Furthermore, the presence of nickel may cause difficulties in manufacturing the glass (the formation of sulphides and nickel inclusions in the glass).

Advantageously, the glass according to the invention contains less than 1500 parts per million, preferably less than 500 parts per million, of manganese expressed by weight of $MnO_2$ with respect to the total weight of glass. Manganese in its $MnO_2$ form is oxidizing in nature, which may modify the redox state of the iron and create a green shade.

Preferably, the glass according to the invention contains more than 2% by weight of magnesium oxide MgO with respect to the total weight of glass. The presence of magnesium is favourable to the melting of the constituents during manufacture of the glass.

Advantageously, the glass according to the invention contains less than 30 parts per million, preferably less than 10 parts per million, by weight of selenium with respect to the total weight of glass. The presence of selenium may give the glass a pink or red coloration, which is undesirable.

It is desirable that the glass does not contain fluorinated compounds or that at least these do not represent more than 0.2% by weight of F with respect to the weight of glass. This is because these compounds result in furnace scrap which is environmentally unfriendly and, in addition, corrosive for the refractories which line the inside of the manufacturing furnace.

The coloured glass according to the invention preferably forms glazing for motor vehicles. It may, for example, be advantageously used as side windows or as the rear window of a vehicle.

The glass according to the invention may be coated with a film. This may be a layer of metal oxides which reduces the extent to which it is heated up by solar radiation and consequently the extent to which the passenger compartment of a vehicle using such glass as glazing is heated up.

The glass according to the present invention can be manufactured by conventional processes. As batch materials, it is possible to use natural materials, recycled glass, slag or a combination of these materials. The constituents of the glass are not necessarily added in the form indicated, but this way of giving the amounts of the components, in equivalents in the forms indicated, corresponds to the standard practice. In practice, the iron is generally added in the form of red iron oxide, the cobalt is added in the form of the hydrated sulphate, such as $CoSO_4.7H_2O$ or $CoSO_4.6H_2O$, and the chromium is added in the form of the dichromate such as $K_2Cr_2O_7$. The cerium is often introduced in the form of the oxide or carbonate, and the vanadium in the form of vanadium oxide or sodium vanadate. The selenium, when it is present, is added in elemental form or in selenite form such as $Na_2SeO_3$ or $ZnSeO_3$.

Other components are sometimes present because of impurities in the batch materials used to manufacture the glass according to the invention, whether in natural materials, in recycled glass or in slag, which are being used increasingly, but when these impurities do not give the glass properties lying outside the limits defined above, these glasses are regarded as being in accordance with the present invention.

The present invention will be illustrated by the following examples:

EXAMPLES 1 to 75

Table I gives by way of non-limiting indication the base composition of the glass. Of course, a glass having the same optical and energy properties may be obtained with a base composition having amounts of oxides falling within the ranges of percentages by weight given at the beginning of the present description.

The glass according to the examples contains less than 1% by weight of $TiO_2$ less than 0.1% of $CeO_2$, less than 100 parts per million (ppm) of NiO, less than 500 ppm $MnO_2$, less than 30 ppm Se, and more than 2% MgO. They have a mean colour rendition index $I_c$ at 4 mm of greater than (−0.59P+81) The precise value of $I_c$ is mentioned each time it is available.

Unless otherwise indicated, the glass according to the examples contains less than 10 ppm $V_2O_5$.

TABLE I

| Base glass composition | |
|---|---|
| $SiO_2$ | 71.5 to 71.9% |
| $Al_2O_3$ | 0.8% |
| CaO | 8.8% |
| MgO | 4.2% |
| $Na_2O$ | 14.1% |
| $K_2O$ | 0.1% |
| $SO_3$ | 0.05 to 0.45%. |

The following tables give the concentrations of the components and the optical and energy properties of glasses according to the invention. The concentrations are determined by X-ray fluorescence of the glass and are converted into the molecular species indicated.

The light transmission $T_x$ of the glass produced for a thickness x may be converted into a light transmission Ty for a thickness y by the following formula:

$$Ty = (1-\rho)^2 \left[\frac{T_x}{(1-\rho)^2}\right]^{\frac{y}{x}}$$

$$\text{with } \rho = \left(\frac{n-1}{n+1}\right)^2 \text{ and } n = 1.5$$

| Tables II-XIV | | | | | | |
|---|---|---|---|---|---|---|
| | Example | | | | | |
| | No. 1 | No. 2 | No. 3 | No. 4 | No. 5 | No. 6 |
| $Fe^{2+}/totFe$ (%) | 36.28 | 34.26 | 33.20 | 27.02 | 40.00 | 25.35 |
| FeO (%) | 0.24 | 0.23 | 0.22 | 0.19 | 0.30 | 0.18 |
| $Fe_2O_3$ (%) | 0.726 | 0.731 | 0.747 | 0.766 | 0.825 | 0.774 |
| $V_2O_5$ (ppm) | | | 36 | | 120 | |
| Co (ppm) | 107 | 66 | 113 | 111 | 91 | 73 |
| $Cr_2O_3$ (ppm) | 208 | 232 | 53 | 44 | 40 | 49 |
| x | 0.2516 | 0.2679 | 0.2494 | 0.2541 | 0.2547 | 0.2695 |
| y | 0.2844 | 0.3059 | 0.271 | 0.2753 | 0.2910 | 0.295 |
| $\lambda_D$ nm | 484.1 | 488 | 481.4 | 481.6 | 485.3 | 484.4 |
| P (%) | 24.6 | 16.5 | 27 | 24.8 | 22.8 | 17 |
| TLA 4 mm (%) | 41.2 | 49.2 | 43.9 | 44.7 | 43.5 | 53.5 |
| TE 4 mm (%) | 30.9 | 34.3 | 33.8 | 36.8 | 29.1 | 40.8 |
| T uvt 4 mm (%) | 19.3 | 19.2 | 20.8 | 17.9 | 18.8 | 18.8 |

-continued

Tables II-XIV

| | | | | | | |
|---|---|---|---|---|---|---|
| Selectivity | 1.33 | 1.43 | 1.30 | 1.21 | 1.5 | 1.31 |
| $I_c$ | 71.8 | 77.2 | 73.9 | 76.2 | | 81.5 |

| | Example | | | | | |
|---|---|---|---|---|---|---|
| | No. 7 | No. 8 | No. 9 | No. 10 | No. 11 | No. 12 |
| $Fe^{2+}/totFe$ (%) | 26.30 | 31.77 | 31.92 | 40 | 31.55 | 33.13 |
| FeO (%) | 0.19 | 0.23 | 0.24 | 0.30 | 0.25 | 0.27 |
| $Fe_2O_3$ (%) | 0.79 | 0.792 | 0.843 | 0.825 | 0.892 | 0.897 |
| $V_2O_5$ (ppm) | | | | 240 | | |
| Co (ppm) | 113 | 71 | 86 | 91 | 48 | 91 |
| $Cr_2O_3$ (ppm) | 240 | 49 | 134 | 0 | 138 | 154 |
| x | 0.2567 | 0.2652 | 0.2606 | 0.2549 | 0.2751 | 0.2576 |
| y | 0.2888 | 0.2929 | 0.2928 | 0.2899 | 0.3139 | 0.2919 |
| $\lambda_D$ nm | 484.5 | 484.5 | 485.1 | 485.0 | 490.2 | 485.2 |
| P (%) | 22.3 | 18.8 | 20.5 | 22.9 | 13.2 | 21.7 |
| TLA 4 mm (%) | 42.6 | 51.2 | 45.8 | 43.5 | 52.2 | 43.3 |
| TE 4 mm (%) | 35 | 35.9 | 32.3 | 29.2 | 33.3 | 29.7 |
| T uvt 4 mm (%) | 18 | 19 | 16.8 | 18.5 | 14.4 | 15.3 |
| Selectivity | 1.22 | 1.43 | 1.42 | 1.49 | 1.57 | 1.46 |
| $I_c$ | 74.3 | 79.2 | 76 | | 79.9 | 74.2 |

| | Example | | | | |
|---|---|---|---|---|---|
| | No. 13 | No. 14 | No. 15 | No. 16 | No. 17 |
| $Fe^{2+}/totFe$ (%) | 38 | 37.90 | 44.78 | 38.32 | 44.91 |
| FeO (%) | 0.28 | 0.29 | 0.32 | 0.29 | 0.33 |
| $Fe_2O_3$ (%) | 0.8250 | 0.853 | 0.801 | 0.852 | 0.818 |
| $SO_3$ (%) | | 0.087 | 0.048 | 0.097 | 0.062 |
| Co (ppm) | 95 | 89 | 68 | 81 | 72 |
| $V_2O_5$ (ppm) | 240 | | | 482 | 648 |
| $Cr_2O_3$ (ppm) | 0 | 120 | 98 | 147 | 137 |
| x | 0.2550 | 0.2605 | 0.2569 | 0.2612 | 0.2562 |
| y | 0.2890 | 0.2968 | 0.2951 | 0.3004 | 0.2967 |
| $\lambda_D$ nm | 484.8 | 486.1 | 486.1 | 487 | 486.5 |
| P (%) | 22.9 | 20.12 | 21.62 | 19.5 | 21.71 |
| TLA 4 mm (%) (1) | 43.39 | 44.58 | 42.74 | 43.4 | 41.85 |
| TE 4 mm (%) (1) | 29.97 | 28.9 | 26.52 | 28.13 | 25.64 |
| T uvt 4 mm (%) | 18.25 | 14.1 | 14.28 | 12.41 | 13.82 |
| Selectivity | 1.45 | 1.54 | 1.61 | 1.54 | 1.63 |
| $I_c$ | | | | | |

| | Example | | | | | |
|---|---|---|---|---|---|---|
| | No. 18 | No. 19 | No. 20 | No. 21 | No. 22 | No. 23 |
| $Fe_2O_3$ (%) | 0.7 | 0.75 | 0.8 | 0.85 | 0.7 | 0.75 |
| Co (ppm) | 80 | 70 | 65 | 60 | 80 | 70 |
| $V_2O_5$ (ppm) | | | | | | |
| $Cr_2O_3$ (ppm) | 232 | 210 | 180 | 230 | 232 | 210 |
| FeO (%) | 0.2394 | 0.2565 | 0.2736 | 0.2907 | 0.2646 | 0.2835 |
| $Fe^{2+}/totFe$ (%) | 38 | 38 | 38 | 38 | 42 | 42 |
| x | 0.2598 | 0.2630 | 0.2642 | 0.2666 | 0.2565 | 0.2596 |
| y | 0.2961 | 0.3008 | 0.3025 | 0.3095 | 0.2939 | 0.2987 |
| TLA 4 mm (%) | 45.77 | 46.90 | 47.20 | 46.88 | 44.20 | 45.33 |
| TE 4 mm (%) | 31.77 | 31.23 | 30.40 | 29.12 | 29.16 | 28.61 |
| T uvt 4 mm (%) | 20.05 | 18.75 | 17.47 | 16.36 | 20.06 | 18.76 |
| Selectivity | 1.44 | 1.50 | 1.55 | 1.61 | 1.52 | 1.58 |
| $\lambda_D$ (nm) | 486.0 | 486.9 | 487.3 | 489.1 | 485.8 | 486.7 |
| P (%) | 20.4 | 18.8 | 18.2 | 16.7 | 21.9 | 20.2 |

| | Example | | | | | |
|---|---|---|---|---|---|---|
| | No. 24 | No. 25 | No. 26 | No. 27 | No. 28 | No. 29 |
| $Fe_2O_3$ (%) | 0.8 | 0.85 | 0.7 | 0.75 | 0.8 | 0.85 |
| Co (ppm) | 65 | 60 | 105 | 90 | 90 | 80 |
| $V_2O_5$ (ppm) | | | | | | |
| $Cr_2O_3$ (ppm) | 180 | 230 | 110 | 150 | 180 | 220 |
| FeO (%) | 0.3024 | 0.3213 | 0.2268 | 0.2430 | 0.2592 | 0.2754 |
| $Fe^{2+}/totFe$ (%) | 42 | 42 | 36 | 36 | 36 | 36 |
| x | 0.2609 | 0.2632 | 0.2513 | 0.2571 | 0.2574 | 0.2615 |
| y | 0.3003 | 0.3074 | 0.2783 | 0.2898 | 0.2930 | 0.3019 |
| TLA 4 mm (%) | 45.63 | 45.31 | 42.86 | 44.38 | 43.33 | 43.97 |
| TE 4 mm (%) | 27.79 | 26.51 | 32.47 | 31.89 | 30.40 | 29.49 |

-continued

Tables II-XIV

| | | | | | | |
|---|---|---|---|---|---|---|
| T uvt 4 mm (%) | 17.48 | 16.37 | 19.68 | 18.47 | 17.36 | 16.20 |
| Selectivity | 1.64 | 1.71 | 1.32 | 1.39 | 1.43 | 1.49 |
| $\lambda_D$ (nm) | 487.0 | 488.7 | 482.8 | 484.7 | 485.5 | 487.4 |
| P (%) | 19.6 | 18.1 | 25.5 | 22.1 | 21.6 | 19.3 |

| | Example | | | | | |
|---|---|---|---|---|---|---|
| | No. 30 | No. 31 | No. 32 | No. 33 | No. 34 | No. 35 |
| $Fe_2O_3$ (%) | 0.88 | 0.85 | 0.82 | 0.8 | 0.81 | 0.6 |
| Co (ppm) | 95 | 75 | 85 | 95 | 105 | 130 |
| $V_2O_5$ (ppm) | | | | | | 253 |
| $Cr_2O_3$ (ppm) | 105 | 50 | 235 | 185 | 171 | 110 |
| FeO (%) | 0.3406 | 0.3443 | 0.3321 | 0.2952 | 0.2843 | 0.1728 |
| $Fe^{2+}$/totFe (%) | 43 | 45 | 45 | 41 | 39 | 32 |
| x | 0.2484 | 0.2534 | 0.2525 | 0.2515 | 0.2493 | 0.2475 |
| y | 0.2834 | 0.2881 | 0.2949 | 0.2881 | 0.2834 | 0.2677 |
| TLA 4 mm (%) | 39.01 | 42.66 | 39.93 | 40.45 | 39.43 | 42.37 |
| TE 4 mm (%) | 23.83 | 24.91 | 23.99 | 26.78 | 27.27 | 36.25 |
| T uvt 4 mm (%) | 15.38 | 15.81 | 17.00 | 17.43 | 17.24 | 19.15 |
| Selectivity | 1.64 | 1.71 | 1.66 | 1.51 | 1.45 | 1.17 |
| $\lambda_D$ (nm) | 484.3 | 484.8 | 486.4 | 485.0 | 484.2 | 480.9 |
| P (%) | 25.9 | 23.6 | 23.2 | 24.3 | 25.6 | 28.1 |

| | Example | | | | | |
|---|---|---|---|---|---|---|
| | No. 36 | No. 37 | No. 38 | No. 39 | No. 40 | No. 41 |
| $Fe_2O_3$ (%) | 0.7 | 0.8 | 0.62 | 0.68 | 0.82 | 0.62 |
| Co (ppm) | 145 | 158 | 115 | 123 | 95 | 85 |
| $V_2O_5$ (ppm) | 52 | 480 | 852 | 942 | 483 | 852 |
| $Cr_2O_3$ (ppm) | 231 | 15 | 52 | 87 | 158 | 52 |
| FeO (%) | 0.1890 | 0.2016 | 0.1730 | 0.1897 | 0.2214 | 0.1786 |
| $Fe^{2+}$/totFe (%) | 30 | 28 | 31 | 31 | 30 | 32 |
| x | 0.2439 | 0.2399 | 0.2565 | 0.2544 | 0.2633 | 0.2666 |
| y | 0.2691 | 0.2568 | 0.2801 | 0.2810 | 0.2978 | 0.2948 |
| TLA 4 mm (%) | 38.61 | 35.78 | 43.56 | 40.61 | 44.62 | 48.45 |
| TE 4 mm (%) | 33.56 | 32.04 | 36.82 | 34.40 | 33.41 | 38.08 |
| T uvt 4 mm (%) | 17.66 | 13.93 | 17.02 | 15.55 | 13.26 | 16.78 |
| Selectivity | 1.15 | 1.12 | 1.18 | 1.18 | 1.34 | 1.27 |
| $\lambda_D$(nm) | 481.8 | 479.9 | 482.4 | 482.9 | 486.1 | 484.8 |
| P (%) | 29.2 | 32.1 | 23.4 | 24.0 | 19.0 | 18.1 |

| | Example | | | | | |
|---|---|---|---|---|---|---|
| | No. 42 | No. 43 | No. 44 | No. 45 | No. 46 | No. 47 |
| $Fe_2O_3$ (%) | 0.7 | 0.852 | 0.825 | 0.72 | 0.88 | 0.62 |
| Co (ppm) | 65 | 72 | 95 | 112 | 98 | 125 |
| $V_2O_5$ (ppm) | 8 | | 240 | 389 | 625 | 12 |
| $Cr_2O_3$ (ppm) | 198 | 215 | 0 | 125 | 242 | 238 |
| FeO (%) | 0.1922 | 0.2147 | 0.30 | 0.2203 | 0.2851 | 0.1841 |
| $Fe^{2+}$/totFe (%) | 30.5 | 28 | 40 | 34 | 36 | 33 |
| x | 0.2719 | 0.2711 | 0.2535 | 0.2530 | 0.2590 | 0.2488 |
| y | 0.3065 | 0.3088 | 0.2879 | 0.2813 | 0.3020 | 0.2757 |
| TLA 4 mm (%) | 52.89 | 50.08 | 42.84 | 42.25 | 39.64 | 42.32 |
| TE 4 mm (%) | 38.60 | 35.70 | 28.9 | 32.66 | 27.03 | 34.99 |
| T uvt 4 mm (%) | 17.04 | 13.58 | 18.54 | 15.91 | 11.75 | 19.49 |
| Selectivity | 1.37 | 1.40 | 1.48 | 1.29 | 1.47 | 1.21 |
| $\lambda_D$ (nm) | 487.9 | 488.7 | 484.7 | 483.2 | 487.5 | 482.5 |
| P (%) | 15.0 | 15.1 | 23.6 | 24.5 | 20.2 | 26.7 |

| | example | | | | | |
|---|---|---|---|---|---|---|
| | N° 48 | N° 49 | N° 50 | N° 51 | N° 52 | N° 53 |
| $Fe_2O_3$ (%) | 0.69 | 0.82 | 0.55 | 0.69 | 0.88 | 0.63 |
| Co (ppm) | 95 | 94 | 87 | 85 | 62 | 114 |
| $V_2O_5$ (ppm) | 357 | | | 275 | | |
| $Cr_2O_3$ (ppm) | 69 | 210 | 123 | | 175 | 234 |
| FeO (%) | 0.2360 | 0.2731 | 0.1708 | 0.2329 | 0.3049 | 0.2381 |
| $Fe^{2+}$/TotFe (%) | 38 | 37 | 34.5 | 37.5 | 38.5 | 42 |
| x | 0.2550 | 0.2557 | 0.2599 | 0.2576 | 0.2654 | 0.2452 |
| y | 0.2828 | 0.2918 | 0.2846 | 0.2824 | 0.3062 | 0.2762 |
| TLA 4 mm (%) | 44.70 | 43.23 | 50.50 | 47.47 | 47.58 | 40.64 |
| TE 4 mm (%) | 32.29 | 29.28 | 38.97 | 33.77 | 28.97 | 29.59 |
| T uvt 4 mm (%) | 16.44 | 14.52 | 20.61 | 16.40 | 12.78 | 19.21 |

-continued

Tables II-XIV

| | | | | | | |
|---|---|---|---|---|---|---|
| Selectivity | 1.38 | 1.48 | 1.30 | 1.41 | 1.64 | 1.37 |
| $\lambda_D$ (nm) | 483.3 | 485.4 | 483.0 | 482.8 | 488.2 | 483.2 |
| P (%) | 23.6 | 22.4 | 21.6 | 22.7 | 17.4 | 27.9 |

| | example | | | | | |
|---|---|---|---|---|---|---|
| | N° 54 | N° 55 | N° 56 | N° 57 | N° 58 | N° 59 |
| $Fe_2O_3$ (%) | 0.75 | 0.87 | 0.6 | 0.69 | 0.85 | 0.61 |
| Co (ppm) | 99 | 135 | 78 | 117 | 104 | 78 |
| $V_2O_5$ (ppm) | | | 359 | 482 | 152 | 102 |
| $Cr_2O_3$ (ppm) | 210 | 52 | | 198 | 212 | |
| FeO (%) | 0.2633 | 0.3210 | 0.2052 | 0.2298 | 0.3213 | 0.2361 |
| $Fe^{2+}$/TotFe (%) | 39 | 41 | 38 | 37 | 42 | 43 |
| x | 0.2524 | 0.2349 | 0.2605 | 0.2504 | 0.2487 | 0.2548 |
| y | 0.2866 | 0.2593 | 0.2847 | 0.2826 | 0.2868 | 0.2789 |
| TLA 4 mm (%) | 42.70 | 34.89 | 49.69 | 39.79 | 38.51 | 48.41 |
| TE 4 mm (%) | 29.50 | 23.64 | 36.14 | 30.61 | 24.36 | 32.97 |
| T uvt 4 mm (%) | 16.21 | 13.35 | 18.26 | 16.60 | 13.56 | 18.64 |
| Selectivity | 1.45 | 1.48 | 1.37 | 1.30 | 1.58 | 1.47 |
| $\lambda_D$ (nm) | 484.5 | 481.2 | 482.9 | 483.9 | 485.0 | 482.4 |
| P (%) | 24.1 | 33.6 | 21.4 | 25.3 | 25.4 | 24.1 |

| | example | | | |
|---|---|---|---|---|
| | N° 60 | N° 61 | N° 62 | N° 63 |
| $Fe_2O_3$ (%) | 0.75 | 0.85 | 0.875 | 0.825 |
| Co (ppm) | 63 | 58 | 87 | 95 |
| $V_2O_5$ (ppm) | | 25 | | |
| $Cr_2O_3$ (ppm) | 85 | 185 | 180 | 120 |
| FeO (%) | 0.2768 | 0.2984 | 0.28 | 0.28 |
| $Fe^{2+}$/TotFe (%) | 41 | 39 | 35 | 38 |
| x | 0.2621 | 0.2668 | 0.2608 | 0.2551 |
| y | 0.2953 | 0.3083 | 0.3049 | 0.2940 |
| TLA 4 mm (%) | 49.24 | 48.41 | 43.70 | 43.06 |
| TE 4 mm (%) | 31.21 | 29.60 | 29.94 | 29.59 |
| T uvt 4 mm (%) | 15.65 | 13.42 | 17.07 | 18.90 |
| Selectivity | 1.58 | 1.64 | 1.46 | 1.46 |
| $\lambda_D$ (nm) | 485.5 | 488.7 | 488.2 | 486.0 |
| P (%) | 19.7 | 16.7 | 19.2 | 22.4 |

| | Example | | | | | |
|---|---|---|---|---|---|---|
| | No. 64 | No. 65 | No. 66 | No. 67 | No. 68 | No. 69 |
| $Fe_2O_3$ (%) | 0.825 | 0.825 | 0.825 | 0.8 | 0.85 | 0.85 |
| Co (ppm) | 95 | 95 | 95 | 86 | 82 | 84 |
| $V_2O_5$ (ppm) | | | | | | |
| $Cr_2O_3$ (ppm) | 80 | 80 | 50 | 40 | 60 | 85 |
| FeO (%) | 0.28 | 0.30 | 0.30 | 0.29 | 0.30 | 0.32 |
| $Fe^{2+}$/totFe (%) | 38 | 40 | 40 | 40 | 39 | 42 |
| x | 0.2546 | 0.2531 | 0.2527 | 0.2558 | 0.2580 | 0.2553 |
| y | 0.2913 | 0.2902 | 0.2881 | 0.2914 | 0.2965 | 0.2954 |
| TLA 4 mm (%) | 43.43 | 42.88 | 43.16 | 45.26 | 45.06 | 43.66 |
| TE 4 mm (%) | 29.83 | 28.76 | 28.94 | 30.27 | 29.53 | 27.63 |
| T uvt 4 mm (%) | 18.87 | 19.16 | 19.14 | 19.70 | 18.17 | 18.64 |
| Selectivity | 1.46 | 1.49 | 1.49 | 1.50 | 1.53 | 1.58 |
| $\lambda_D$ (nm) | 485.4 | 485.3 | 484.9 | 485.3 | 486.3 | 486.3 |
| Purity (%) | 22.8 | 23.5 | 23.9 | 22.4 | 21.1 | 22.2 |

| | Example | | | | | |
|---|---|---|---|---|---|---|
| | No. 70 | No. 71 | No. 72 | No. 73 | No. 74 | No. 75 |
| $Fe_2O_3$ (%) | 0.84 | 0.82 | 0.8 | 0.8 | 0.83 | 0.825 |
| Co (ppm) | 98 | 98 | 102 | 89 | 94 | 95 |
| $V_2O_5$ (ppm) | | | | | | 120 |
| $Cr_2O_3$ (ppm) | 92 | 115 | 135 | 153 | 172 | 40 |
| FeO (%) | 0.31 | 0.30 | 0.27 | 0.30 | 0.30 | 0.28 |
| $Fe^{2+}$/totFe (%) | 41 | 41 | 38 | 41 | 40 | 38 |
| x | 0.2513 | 0.2517 | 0.2530 | 0.2554 | 0.2546 | 0.2548 |
| y | 0.2892 | 0.2903 | 0.2909 | 0.2969 | 0.2970 | 0.2902 |
| TLA 4 mm (%) | 41.69 | 41.87 | 42.22 | 43.43 | 42.09 | 43.41 |
| TE 4 mm (%) | 27.53 | 27.96 | 29.77 | 28.86 | 28.12 | 29.90 |
| T uvt 4 mm (%) | 18.94 | 19.49 | 19.67 | 19.96 | 19.08 | 18.56 |
| Selectivity | 1.51 | 1.50 | 1.42 | 1.50 | 1.50 | 1.45 |

-continued

| | | Tables II-XIV | | | | |
|---|---|---|---|---|---|---|
| λ_D (nm) | 485.3 | 485.5 | 485.5 | 486.6 | 486.7 | 485.1 |
| Purity (%) | 24.2 | 24.0 | 23.4 | 22.0 | 22.3 | 22.9 |

The invention claimed is:

1. Coloured soda-lime glass which comprises:
   iron in an amount which, expressed by weight of $Fe_2O_3$ oxide with respect to the total weight of glass, is between 0.5 and 0.9% (total amount of iron);
   ferrous iron in an amount which, expressed by weight of $Fe^{2+}$ atoms with respect to the total weight of iron atoms present in the glass, is between 25 and 45% ($Fe^{2+}$/total Fe ratio);
   cobalt in an amount which, expressed by weight of Co with respect to the total weight of glass, is at least 5 parts per million;
   chromium and/or vanadium, with no titanium oxide being added;
   manganese is present in an amount which, expressed by weight of $MnO_2$ with respect to the total weight of the glass, is at most 0.50%;
   and the glass has:
   a light transmission, measured under illuminant A and calculated for a thickness of 4 mm, of between 20 and 60% (TLA4),
   an energy transmission, measured according to the Moon distribution and calculated for a thickness of 4 mm, of between 10 and 50% (TE4) and
   a dominant wavelength $\lambda_D$ in transmission of less than 489.1 nm, and
   a selectivity greater than 1.2%.

2. Coloured soda-lime glass according to claim 1 in which manganese is present in an amount which, expressed by weight of $MnO_2$ with respect to the total weight of the glass is at most 0.050%.

3. Coloured soda-lime glass according to claim 1, characterized in that it includes at least one of the following features (a) through (m):
   (a) the amount of total iron is less than or equal to 0.89%;
   (b) the amount of total iron is at least 0.7%;
   (c) the amount of cobalt is less than or equal to 300 parts per million;
   (d) the amount of chromium, if chromium is present, is greater than 10 parts per million, expressed by weight of $Cr_2O_3$ with respect to the total weight of glass;
   (e) the amount of chromium, if chromium is present, is less than or equal to 300 parts per million, expressed by weight of $Cr_2O_3$ with respect to the total weight of glass;
   (f) the amount vanadium, if vanadium is present, is between 50 and 500 parts per million, express by weight of $V_2O_5$ with respect to the total weight of glass;
   (g) the light transmission TLA4 is between 25 and 55%;
   (h) the energy transmission TE4 is between 15 and 40%;
   (i) the excitation purity in transmission is greater than 5%;
   (j) the amount of cerium, if cerium is present, is less than 2% expressed by weight of $CeO_2$ with respect to the total weight of glass;
   (k) the amount of nickel, if nickel is present, is less than 200 parts per million expressed by weight of NiO with respect to the total weight of glass;
   (l) the amount of magnesium, if magnesium is present, is greater than 2% by weight of magnesium oxide MgO with respect to the total weight of glass;
   (m) the amount of selenium, if selenium is present, is less than 30 parts per million by weight of selenium with respect to the total weight of glass.

4. Coloured soda-lime glass according to claim 3 and further including at least two of the aforementioned features (a) through (m).

5. Coloured soda-lime glass according to claim 3 and further including at least five of the aforementioned features (a) through (m).

6. Coloured soda-lime glass according to claim 3 and further including at least ten of the aforementioned features (a) through (m).

7. Coloured soda-lime glass according to claim 3 and further including all of the aforementioned features (a) through (m).

8. Coloured soda-lime glass according to claim 3, characterized in that it includes at least one of the following features (p) through (z):
   (p) the amount of total iron is less than or equal to 0.88%;
   (q) the amount of total iron is at least 0.75%;
   (r) the amount of cobalt is between 20 and 200 parts per million;
   (s) the amount of chromium, if chromium is present, is greater than 20 parts per million, expressed by weight of $Cr_2O_3$ with respect to the total weight of glass;
   (t) the amount of chromium, if chromium is present, is less than or equal to 250 parts per million, expressed by weight of $Cr_2O_3$ with respect to the total weight of glass;
   (u) the light transmission TLA4 is between 38 and 52%;
   (v) the energy transmission TE4 is between 22 and 34%;
   (w) the amount of cerium, if cerium is present, is less than 1% expressed by weight of $CeO_2$ with respect to the total weight of glass;
   (x) the amount of nickel, if nickel is present, is less than 100 parts per million expressed by weight of NiO with respect to the total weight of glass;
   (y) the amount of selenium, if selenium is present, is less than 10 parts per million by weight of selenium with respect to the total weight of glass;
   (z) the excitation purity in transmission is greater than 10%.

9. Coloured soda-lime glass according to claim 8 and including at least two of the aforementioned features (p) through (z).

10. Coloured soda-lime glass according to claim 8, and including at least five of the aforementioned features (p) through (z).

11. Coloured soda-lime glass according to claim 8, and including all of the aforementioned features (p) through (z).

12. Coloured soda-lime glass according to claim 11 coated with a film.

13. Coloured soda-lime glass according to claim 8, and including cobalt in the amount of between 60 and 120 parts per million.

14. Coloured soda-lime glass according to claim 8 coated with a film.

* * * * *